United States Patent
Rimchala

(10) Patent No.: US 11,798,301 B1
(45) Date of Patent: Oct. 24, 2023

(54) COMPOSITIONAL PIPELINE FOR GENERATING SYNTHETIC TRAINING DATA FOR MACHINE LEARNING MODELS TO EXTRACT LINE ITEMS FROM OCR TEXT

(71) Applicant: INTUIT INC., Mountain View, CA (US)

(72) Inventor: Tharathorn Rimchala, Mountain View, CA (US)

(73) Assignee: INTUIT INC., Mountain View, CA (US)

( * ) Notice: Subject to any disclaimer, the term of this patent is extended or adjusted under 35 U.S.C. 154(b) by 0 days.

(21) Appl. No.: 18/047,008

(22) Filed: Oct. 17, 2022

(51) Int. Cl.
| | | |
|---|---|---|
| *G06V 30/19* | (2022.01) | |
| *G06N 20/00* | (2019.01) | |
| *G06V 30/42* | (2022.01) | |
| *G06V 30/416* | (2022.01) | |
| *G06V 30/30* | (2022.01) | |
| *G06V 30/414* | (2022.01) | |

(52) U.S. Cl.
CPC ....... *G06V 30/19147* (2022.01); *G06N 20/00* (2019.01); *G06V 30/30* (2022.01); *G06V 30/414* (2022.01); *G06V 30/416* (2022.01); *G06V 30/42* (2022.01)

(58) Field of Classification Search
CPC ...... G06V 30/30; G06V 30/42; G06V 30/414; G06V 30/416; G06V 30/19147; G06N 20/00
See application file for complete search history.

(56) References Cited

U.S. PATENT DOCUMENTS

| | | | | |
|---|---|---|---|---|
| 10,546,054 | B1 * | 1/2020 | Foroughi | G06F 16/287 |
| 10,970,530 | B1 * | 4/2021 | Adam | G06V 30/416 |
| 11,087,081 | B1 * | 8/2021 | Srivastava | G06F 40/169 |
| 11,238,312 | B2 * | 2/2022 | Kaynig-Fittkau | G06V 10/82 |

OTHER PUBLICATIONS

Inoue, "Data Augmentation by Pairing Samples for Images Classification", arXiv:1801.02929v2 [cs.LG] Apr. 11, 2018, 8 pgs.
Ratner et al., "Snorkel: Rapid Training Data Creation with Weak Supervision", arXiv:1711.10160v1 [cs.LG] Nov. 28, 2017, 17 pgs.

(Continued)

*Primary Examiner* — Daniel G Mariam
(74) *Attorney, Agent, or Firm* — DLA PIPER LLP (US)

(57) ABSTRACT

Systems and methods of generating synthetic training data for machine learning models. First, line items in source documents such as bills, invoices, and or receipts are identified and labeled. The identification and labeling generate labeled documents. Then, in the labeled documents, the line items are augmented by adding, deleting, and or swapping line items to generate synthetic training documents. An addition operation randomly selects one or more line items and adds the selected line item(s) to the same labeled document or another labeled document. A deletion operation randomly deletes one or more line items. A swapping operation randomly swaps line items in a single labeled document or across different labeled documents. These operations can generate synthetic labeled documents of any length, which form synthetic training data for training the machine learning models.

18 Claims, 11 Drawing Sheets

(56) References Cited

OTHER PUBLICATIONS

Sun et al., "Mixup-Transformer: Dynamic Data Augmentation for NLP Tasks", Proceedings of the 28$^{th}$ International Conference on Computerized Linguistics, Dec. 8-13, 2020, pp. 3436-3440.
Vu et al., "STraTA: Self-Training with Task Augmentation for Better Few-Shot Learning", Proceedings of the 2021 Conference on Empirical Methods in Natural Language Processing, Nov. 7-11, 2021, pp. 5715-5731.
Zhang et al., "mixup: Beyond Empirical Risk Minimization", arXiv:1710.09412v2 [cs.LG] Apr. 27, 2018, 13 pgs.

* cited by examiner

300

COMPOSITIONAL PIPELINE FOR GENERATING SYNTHETIC TRAINING DATA FOR MACHINE LEARNING MODELS TO EXTRACT LINE ITEMS FROM OCR TEXT

BACKGROUND

Machine learning models have been widely used in natural language processing. These models are trained to leverage semantic and syntactic meanings of words, phrases, clauses, and even sentences and paragraphs. One use case for these models relates to processing captured text using optical character recognition (OCR): that is, a document image is captured, the text therein is recognized (often using other machine learning models), and natural language processing models are used to determine the meaning of the underlying information in the recognized text.

A particular use of natural language processing models is for understanding bills, invoices, and or receipts and automate the processing of the underlying information in these financial documents. A major technical challenge for these types of documents is the variability of the length and the content, especially those present in the line items in these documents. In other words, bills, invoices, and receipts contain arbitrary numbers of line items. A grocery receipt, for example, may generally include more than twenty line items, but a tuition bill may have a single line item and a contractor's invoice may have merely a few line items. Machine learning models (e.g., natural language processing models) may therefore have to be trained to handle the arbitrariness of the number of items in these types of documents.

A lack of fully labeled training datasets, however, is a major hurdle in using state-of-the-art (SoTA) machine learning models for information extraction such as multimodal transformer architectures. For example, open source datasets with line item annotations (WildReceipt and CORD) are available, but these are small scale datasets (on the order of 1000 documents per dataset or fewer). More importantly, the distribution of the number of line items for these and other available datasets is heavily skewed. For instance, the majority of the documents have just a few line items (e.g., around 90% of the documents contain five line items or less) while documents with larger number of line items are rare. The machine learning models trained on these heavily skewed datasets are therefore inaccurate for the rare documents containing larger numbers of line items and have poor prediction potential, particularly for bills, invoices, and or receipts with a larger number of line items.

SUMMARY

Embodiments disclosed herein solve the aforementioned technical problems and may provide other technical solutions as well. In one or more embodiments, systems and methods of generating synthetic training data for machine learning models are provided. First, line items in source documents such as e.g., bills, invoices, and or receipts are identified and labeled. The identification and labeling generate labeled documents. Then, in the labeled documents, the line items are augmented by adding, deleting, and or swapping line items to generate synthetic training documents. An addition operation randomly selects one or more line items and adds the selected line item to the same labeled document or another labeled document. A deletion operation randomly deletes one or more line items. A swapping operation randomly swaps line items in a single labeled document or across different labeled documents. These operations can generate synthetic labeled documents of any length, which form synthetic training data for training the machine learning models.

DETAILED DESCRIPTION OF SEVERAL EMBODIMENTS

Embodiments disclosed herein are directed to generating synthetic training data for training machine learning models for key information extraction using multimodal deep learning models. As described above, existing training data is scarce and skewed. The machine learning models trained using existing data therefore have low prediction accuracy particularly for the minority subset of documents such as documents with a large number of line items. The embodiments disclosed herein can take original, labeled documents as seed documents and apply line-wise augmentation on these documents to generate new data points representing the minority subset. The line-wise augmentation comprises a set of "atomic" and independent operations including randomly adding one or more lines, randomly deleting one or more lines, and or randomly swapping one or more lines within one or more documents. Various permutations of these line-wise augmentation techniques can be used to generate synthetic training data with documents and corresponding key information extraction ground truths of desired sizes and randomness without requiring additional human-in-the-loop annotation of these documents (as the KIE ground truths are derivable from the permutation sequence of the line-wise operations). Additionally, the embodiments are also directed to labeling source documents to indicate line item amounts and line item descriptions.

Figure 1:
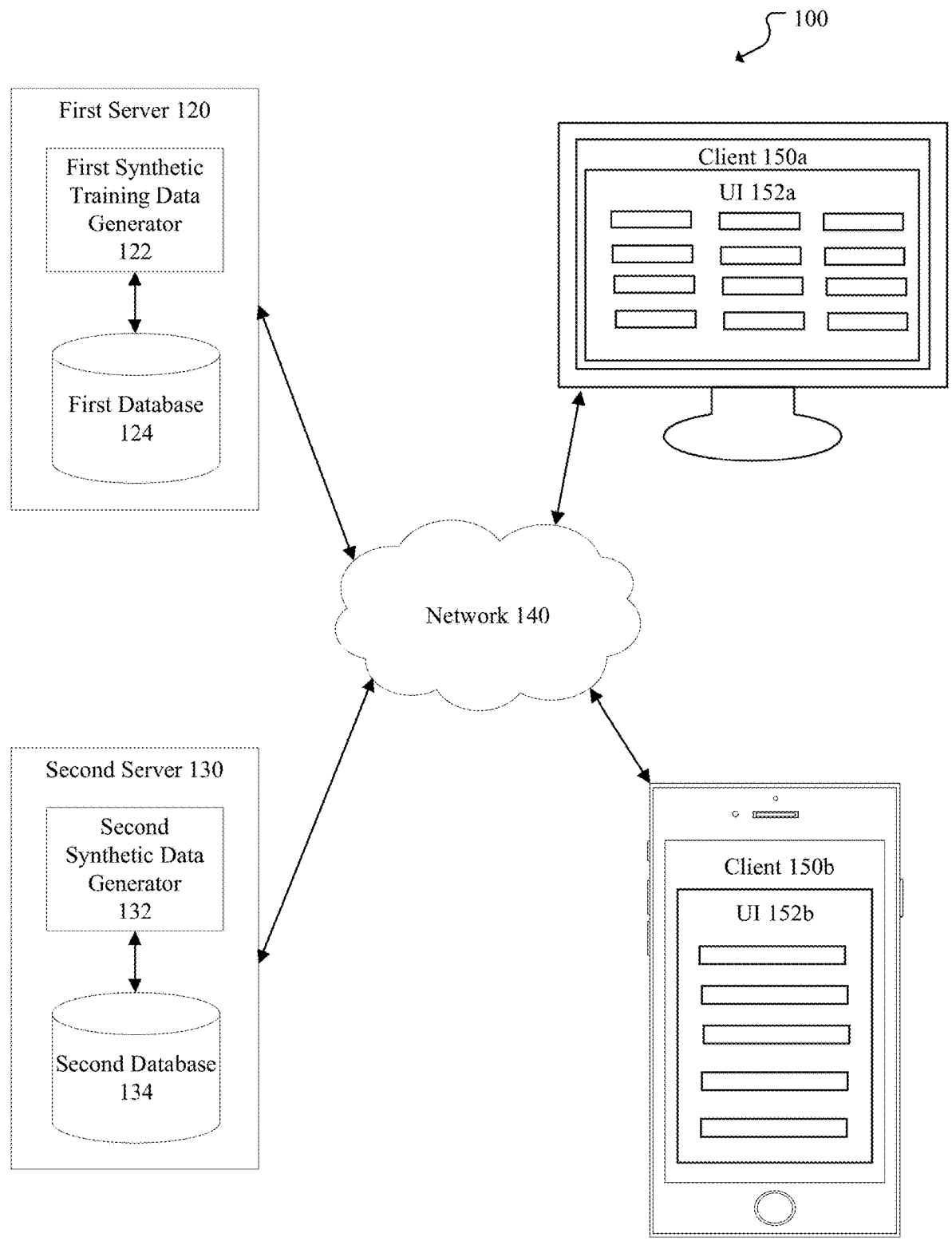
FIG. 1 shows an example of a system configured for generating synthetic training data for machine learning models, based on the principles disclosed herein.

FIG. 1 shows an example of a system 100 configured for generating synthetic training data for machine learning models, based on the principles disclosed herein. It should be understood that the components of the system 100 shown in FIG. 1 and described herein are merely examples and systems with additional, alternative, or fewer number of components should be considered within the scope of this disclosure.

As shown, the system 100 comprises client devices 150a, 150b (collectively referred to herein as "client devices 150") and servers 120, 130 interconnected through a network 140. The first server 120 hosts a first synthetic training data generator 122 and a first database 124 and the second server 130 hosts a second synthetic data generator 132 and a second database 134. The client devices 150a, 150b have user interfaces 152a,152b, respectively, (collectively referred to herein as user interfaces (UIs) 152) which may be used to communicate with the synthetic data generators 122, 132 using the network 140. For example, communication between the different components of the system 100 is facilitated by one or more application programming interfaces (APIs). APIs of system 100 may be proprietary and or may include such APIs as Amazon® Web Services (AWS) APIs or the like. The network 140 may be the Internet and or other public or private networks or combinations thereof. The network 140 therefore should be understood to include any type of circuit switching network, packet switching network, or a combination thereof. Non-limiting examples of the network 140 may include a local area network (LAN), metropolitan area network (MAN), wide area network (WAN), and the like.

Client devices 150 include any device configured to present user interfaces (UIs) 152 and receive user inputs. The client devices 150 may generally be used by administrative and specialized users to train machine learning models (e.g., natural language processors), which also can be hosted by the serves 120, 130. In one or more embodiments, the users interact with the synthetic training data generators 122, 132 to generate synthetic training data for training the models. The interactions may include, for example, identifying source documents to be used, configuration parameters (such as length) for synthetic documents, operations (such as adding, deleting, swapping) to be used for generating synthetic data, and or any other types of interactions.

Each of the synthetic training data generators 122, 132 perform the different operations described throughout this disclosure. For instance, the synthetic training data generators 122, 132 can retrieve documents, identify line item blocks (i.e., the blocks containing the line items) in the documents, identify the individual line items in the line item blocks, determine if arithmetic constraints are satisfied, randomly add one or more line items in the line item blocks, randomly delete one or more line items in the line item blocks, and or randomly swap line items. The operations of random additions, deletions, and or swapping generate synthetic labeled documents form the synthetic training data in accordance with the disclosed principles. The synthetic training documents can be configured to be of any size by using different permutations of the addition, deletion, and or swapping operations. Once generated, the synthetic training data is stored in the corresponding databases 124, 134.

First server 120, second server 130, first database 124, second database 134, and client devices 150 are each depicted as single devices for ease of illustration, but those of ordinary skill in the art will appreciate that first server 120, second server 130, first database 124, second database 134, and or client devices 150 may be embodied in different forms for different implementations. For example, any or each of first server 120 and second server 130 may include a plurality of servers or one or more of the first database 124 and second database 134. Alternatively, the operations performed by any or each of first server 120 and second server 130 may be performed on fewer (e.g., one or two) servers. In another example, a plurality of client devices 150 may communicate with first server 120 and/or second server 130. A single user may have multiple client devices 150, and/or there may be multiple users each having their own client devices 150.

Figure 2:
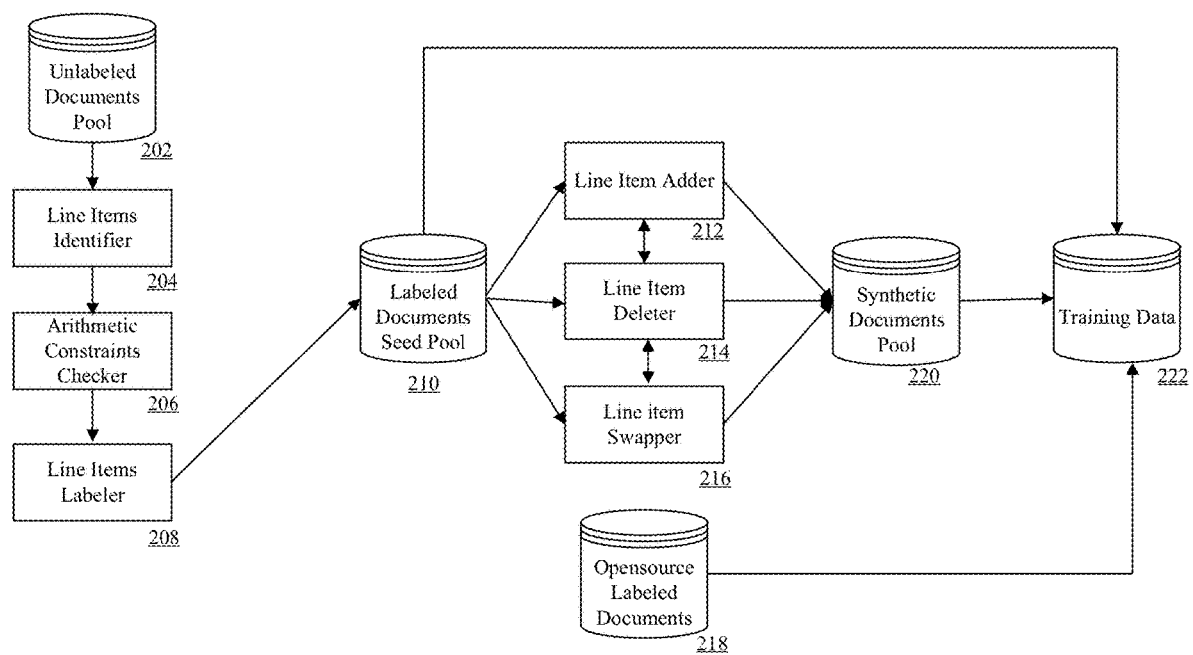
FIG. 2 shows an example architecture for generating synthetic training data for machine learning models, based on the principles disclosed herein.

FIG. 2 shows an example architecture 200 for generating synthetic training data for machine learning models, based on the principles disclosed herein. The example architecture 200 may be implemented by any combination of the components of the system 100 shown in FIG. 1. It should be understood that the architecture 200 and its constituent components are just for illustration and should not be considered limiting. Architectures with additional, alternative, and fewer number of components should also be considered within the scope of this disclosure.

Within the architecture 200, a line items identifier module 204 identities the line items segments/blocks in an unlabeled documents pool 202. To that end, the line items identifier module 204 first identifies line item blocks for the documents in the unlabeled document pool 202. The identification of the line item blocks can be performed through geometric bounding using known locations of other blocks (e.g., vendor name and address). Alternatively or additionally, the identification of the line item blocks can be performed through a separately trained machine learning object detection models such as table detection models. Once the line item blocks are identified, the line items identifier module 204 performs OCR on the text to extract the amounts in the line items.

An arithmetic constraints checker module 206 determines whether the line items amounts satisfy one or more arithmetic constraints in the corresponding documents. For example, the sum of the amounts in the document should be greater than or equal or approximately equal to a "SUBTOTAL" field. If the arithmetic constraints are satisfied, a line labeler module 208 locates the line items by searching for the line item amounts (e.g., numeric/dollar value for each line item) and line item descriptions (e.g., text that identifies the corresponding line item). Once the line items are located for the documents in the pool 202, these "inferred line item labeled information (e.g., inferred line item and descriptions)" along with the documents are stored in a line item label inferred documents seed pool 210. The line item label inferred documents seed pool 210 provides a starting set (or seed) for generating synthetic documents in accordance with the disclosed principles.

Using the labeled documents seed pool 210, a line item adder module 212 inserts one or more randomly selected line items in line item blocks within a single document or across different documents, update the corresponding ground truth information and updates the locations of the rest of the content of the document accordingly such that the resulting documents look realistic (e.g. no occlusion). The addition (e.g., insertion operation; the term "addition" therefore includes the term "insertion") will increase the number of line items of the document. Additionally or alternatively, a line item delete module 214 deletes one or more line items in a document or across different documents, updating ground truth information, and adjust the location of the rest of the content in the document such that there are no apparent "line item gap" resulting from this operation. The deletion operation will decrease the number of line items of the document. Additionally or alternatively, a line item swapper module 216 swaps randomly selected line items within a document or across different documents and update the corresponding ground truth information associated with the document. The swapping operations may not necessarily impact the number of line items of the documents, but cause changes in the organization of the line items in the documents, thereby yielding synthetic documents that appear different from the seed document. The addition, deletion, and swapping operations can be performed in a coordinated fashion with different permutations based on the desired number of line items and the overall training document set size for the training the key information extraction (KIE) models. Each of the modules 212, 214, 216 also performs arithmetic operations such that other blocks are consistent (e.g., the SUBTOTAL, TAX %, and TOTAL fields are updated) with the additions, deletions, and or swappings. In other words, appropriate numerical changes to these fields are made as the additions, deletions, and or swappings take place.

The permutations of operations performed by the line item adder module 212, the line item deleter module 214, and or the line item swapper module 216 therefore generate a synthetic documents pool 220. The synthetic documents pool forms the synthetic training data. In one or more embodiments, the sizes and or the randomness of the documents within the synthetic documents pool can be customized as desired.

Using the architecture 200, training data 222 is increased significantly with the addition of the synthetic documents pool 220. As shown in the illustrated example, the training data 222 may also include open-source labeled documents 218. The presence of the synthetic documents pool 220 provides an enormous amount of flexibility to control the size of the training data 222 as desired.

Figure 3:
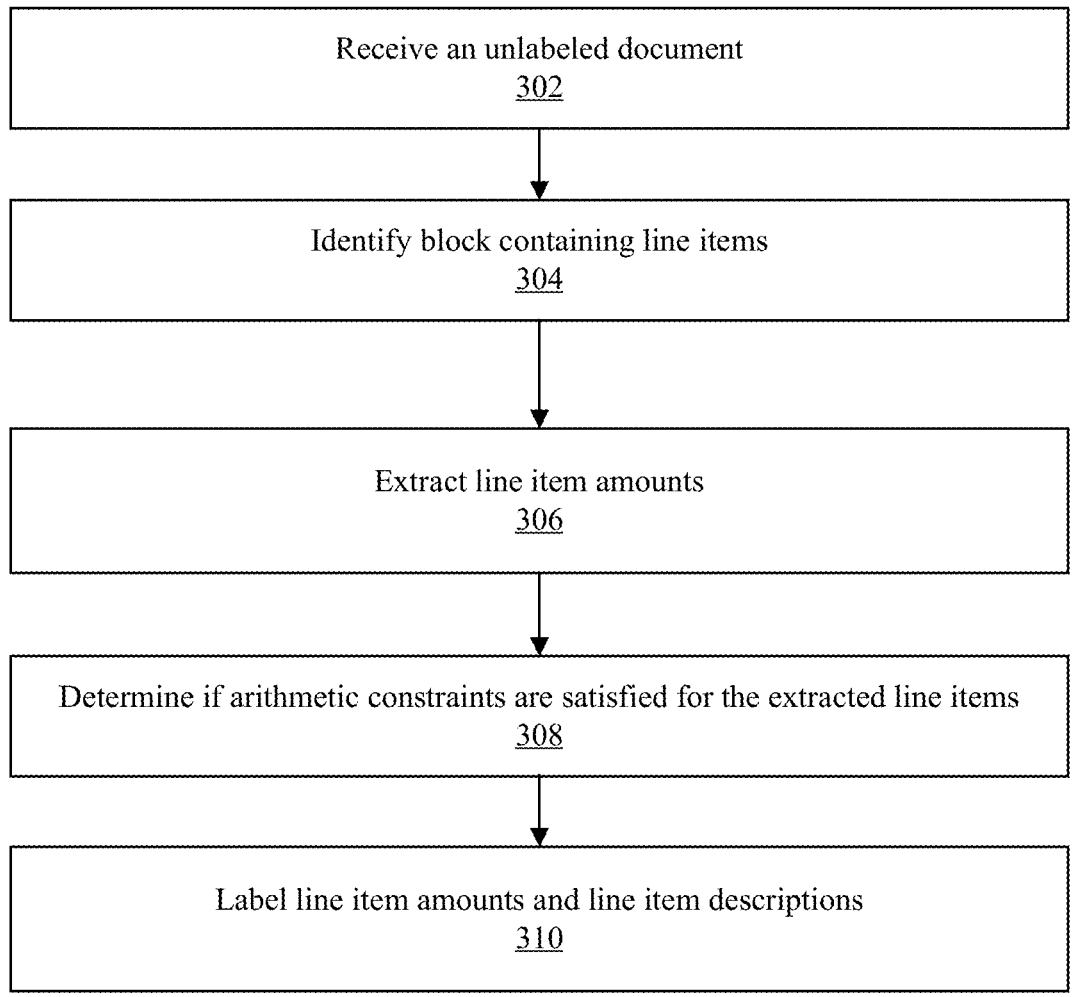
FIG. 3 shows a flow diagram of an example method of labeling a document, based on the principles disclosed herein.

FIG. 3 shows a flow diagram of an example method 300 of labeling a document, based on the principles disclosed herein. The labeling may be performed on source documents such as bills, invoices, and or receipts. It should be understood that method 300 shown in FIG. 3 and described herein is just an example, and methods with additional, alternative, and or fewer number of steps should be considered within the scope of this disclosure. The steps of the method 300 may be performed by one or more components of the system 100 shown in FIG. 1 and or one or more components of the architecture 200 shown in FIG. 2.

The method 300 begins at step 302, where an unlabeled document is received. The document may be an electronic document in any format, including but not limited to, PDF, JPEG, TIFF, BMP, MS-Word, etc. In one or more embodiments, the document may be a receipt, bill, or an invoice, each of which may comprise multiple line items. The line items are generally organized in a line items block.

Figure 4A:
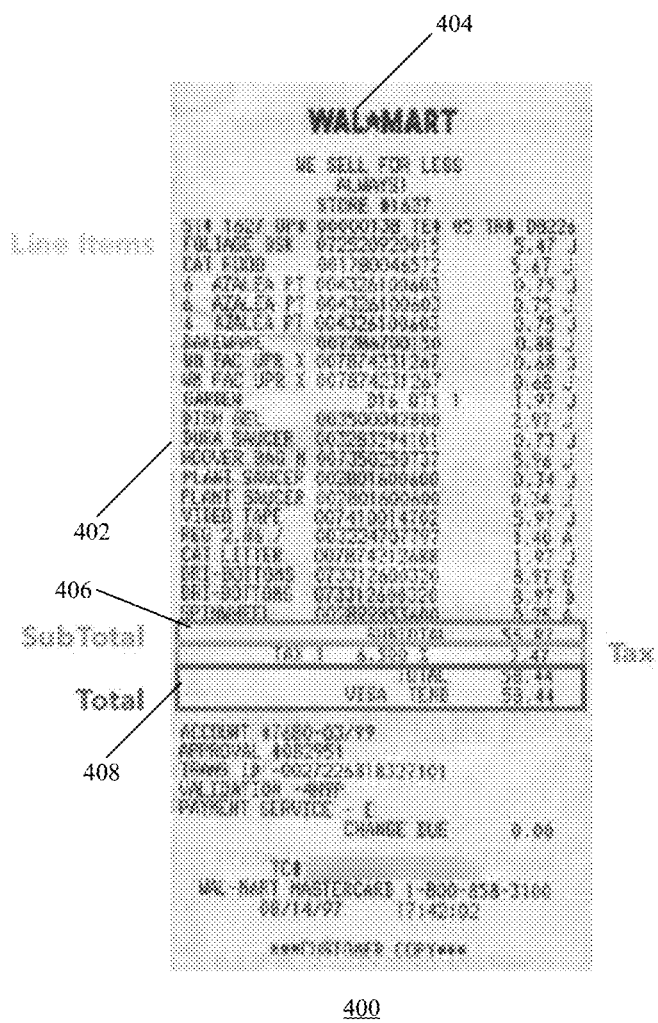
FIG. 4A shows an example heuristics based approach for identifying a line items block, based on the principles disclosed herein.

In step 304, a block containing the line items (also referred to as line items block throughout this disclosure) is identified. The block is generally the portion of the document where the line items are sequentially listed. In one or more embodiments, the line items may be extracted by a heuristics based approach. FIG. 4A shows an example heuristics based approach for identifying a line items block, based on the principles disclosed herein. In particular, a receipt 400 is shown, in which the location of a line items block 402 is determined using the location of the vendor field 404, location of the SUBTOTAL field 406, and or location of the TOTAL field 408. The known relative locations of the vendor field 404, the SUBTOTAL field 406, and or the TOTAL field 408 may allow a geometric localization of the line item block 402 vis-à-vis these other locations. The locations of vendor, SUBTOTAL, TOTAL are already available in many open-source datasets and existing in-house datasets and they are relatively less laborious and inexpensive to obtain because there are only relatively few of these fields compared to the number of line items in a document and they are relatively easy to recognize and record by human annotators. These are just some examples and other field locations such as the location of the vendor address, TAX field, DATE/TIME field, payment service information (e.g., identification of payment method such as a credit card) can also be used to localize the line items block 402.

Figure 4B:
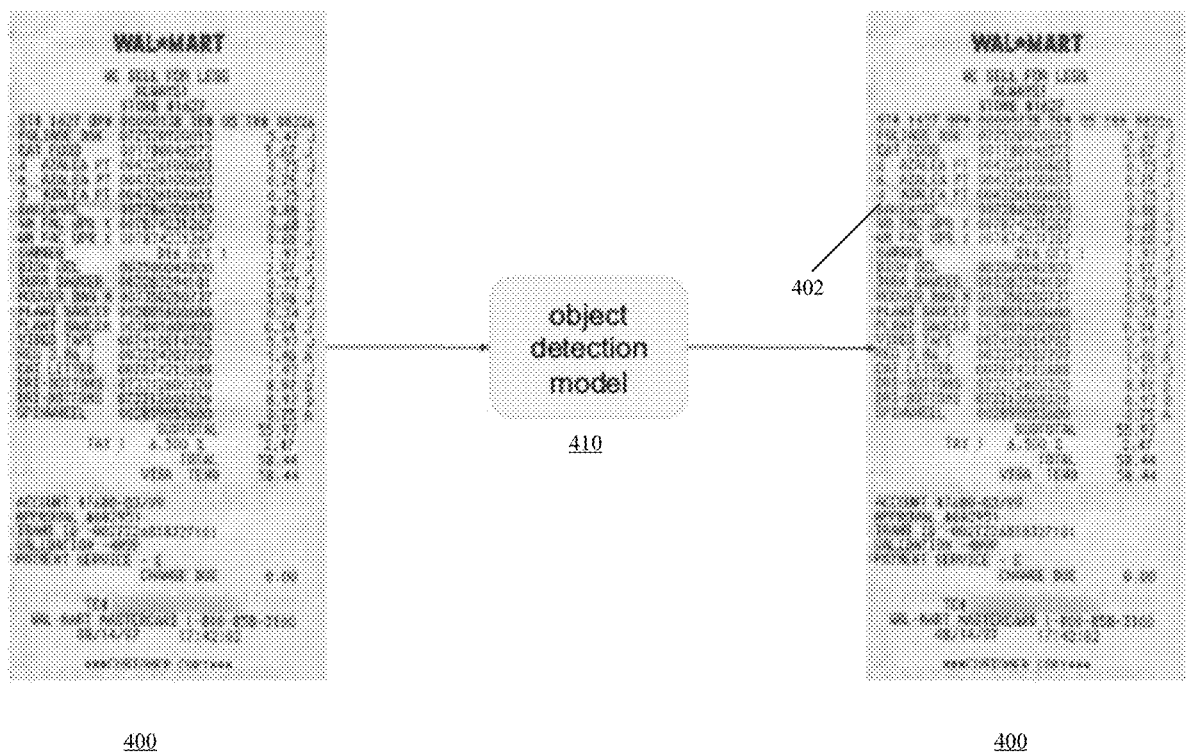
FIG. 4B shows an example machine learning based approach for identifying a line items block, based on the principles disclosed herein.

In one or more embodiments, the line items block is identified using a machine learning approach. FIG. 4B shows an example machine learning based approach for identifying a line items block, based on the principles disclosed herein. For the machine learning based approach, a pre-trained object detection model 410 is deployed. The object detection model 410 may comprise, for example, a table detection model based on the MaskRCNN architecture trained on a large scale table detection dataset called PubLayNet, FinTabNet, TableBank, and or third party table detection services such as Amazon® Textract, etc. Using the detection model 410, the line items block 402 is identified.

Figure 4C:
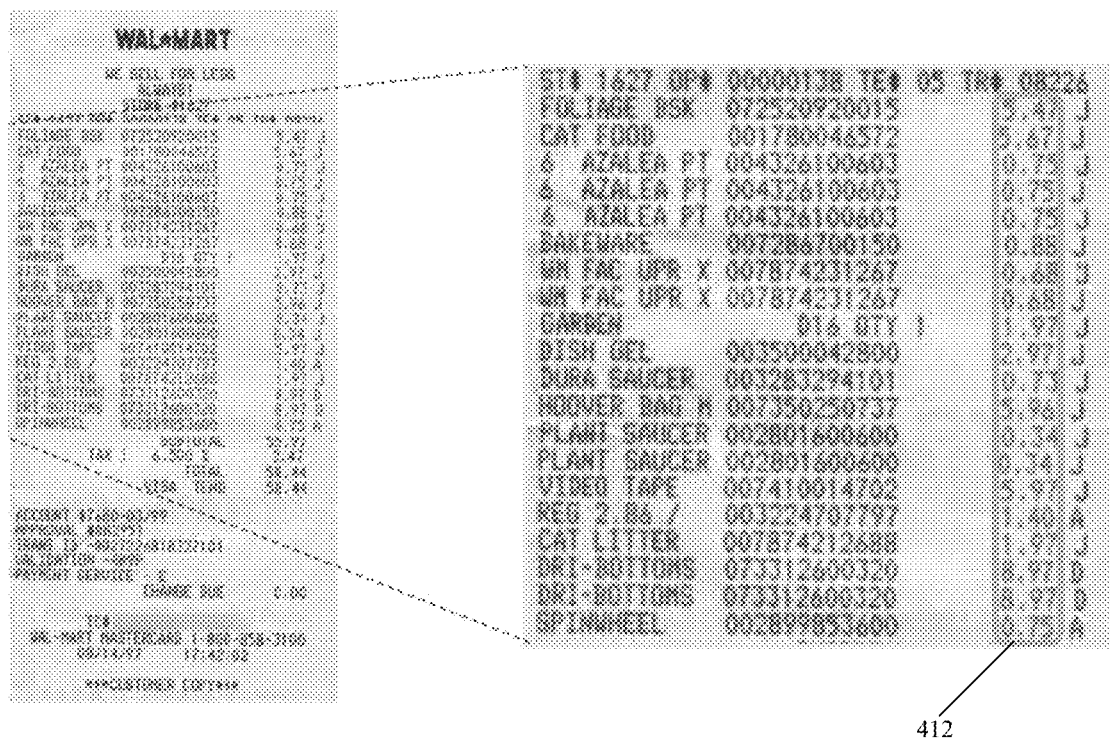
FIG. 4C shows an example of line item amount extraction, based on the principles disclosed herein.

At step 306, line item amounts are extracted. The line item amounts include the prices listed alongside the individual line items, i.e., prices for the goods and services for the bill, invoice, and or receipt. OCR algorithms are run on the entire document which contains the OCR information of the line item blocks (e.g., block 402 in FIGS. 4A-4B). On the OCR output, a regular expression for numeric strings with two decimal places (i.e., consistent with how monetary amounts are expressed) is applied to obtain a subset of matched numeric strings. These matched numeric strings are the candidates that possibly represent line item amount fields. In some cases, the numeric strings that are statistically far out of vertical alignment may be filtered out from the seed pool to increase the robustness of the line item extractions. FIG. 4C shows an example of line item amount extraction, based on the principles disclosed herein. As shown, line items 412 have been extracted from the receipt 400 using the one or more embodiments disclosed herein.

At steps 308, it is determined whether arithmetic constraints are satisfied for the extracted line items. For instance, given the candidate subsets of the amount strings and a total amount in the TOTAL field (e.g., TOTAL field 408 in FIG. 4A), the amount values should add up to approximately slightly below the total amount. This constraint is approximate because of the varying tax rates that need to be added to the total amount. In addition to or in the alternative, a subtotal constraint may be used. That is, the price of the line items in the line item block is added to determine whether the sum is equal or approximately equal (e.g., to accommodate for the rounding errors) to a SUBTOTAL field (e.g., subtotal 406 in FIG. 4A). Furthermore, tax can be added to the subtotal to generate a total that is compared to the total (e.g., total 408 in FIG. 4A). The constraint is additionally satisfied if the computed total—i.e., from the subtotal and tax—is equal to or approximately equal to the listed TOTAL field. The ground truth values of the SUBTOTAL and TOTAL are already available in many open-source datasets and existing in-house datasets and are relatively inexpensive to obtain—they constitute a relatively few and easy to recognize by human annotators. These are examples of some arithmetic constraint checks that could be used, and it should be appreciated that any kind of arithmetic constraint check could be considered within the scope of this disclosure.

At step 310, the line item amounts and the line item descriptions are labeled. In one or more embodiments, however, the line item amounts may be labeled in step 306 (i.e., when the line items are extracted) and or step 308 (i.e., when the arithmetic constraints are checked). In these embodiments, for labeling the line item descriptions, the vertical positions of the line item amounts is used to define a line in the line item block. Then, the text that comes before the line item amount is labeled as the line item description for the corresponding line.

Figure 5:
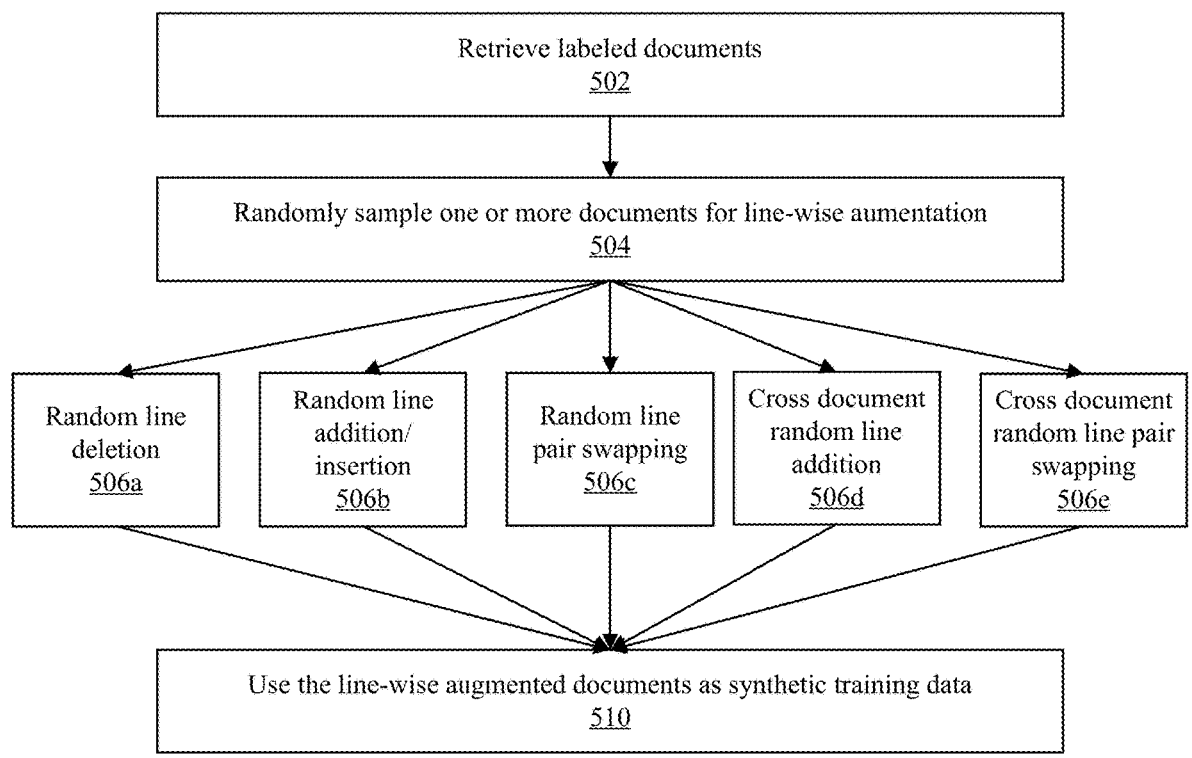
FIG. 5 shows a flow diagram of an example method of generating synthetic training data, based on the principles disclosed herein.

FIG. 5 shows a flow diagram of an example method 500 of generating synthetic training data, based on the principles disclosed herein. The synthetic training data comprise augmented bills, invoices, and or receipts. It should be understood that method 500 shown in FIG. 5 and described herein is just an example, and methods with additional, alternative, and or fewer number of steps should be considered within the scope of this disclosure. The steps of the method 500 may be performed by one or more components of the system 100 shown in FIG. 1 and or one or more components of the architecture 200 shown in FIG. 2.

The method 500 may begin at step 502, where labeled documents are retrieved. The labeled documents may comprise one or more of a bill, receipt, or an invoice. The labeling may be for line items with separate labels for line item amounts and line item descriptions. In some embodiments, the labeling is performed using the method 300 shown in FIG. 3.

At step 504, one or more documents are randomly sampled for line-wise augmentation. The line-wise augmentation produces synthetic training data (document image and corresponding line item information ground truths) for training a key information extraction machine learning models. That is, the method 500 may take as base data the labeled documents (i.e., the documents seed pool and their corresponding ground truths) and generate, using the base data and the steps described herein, synthetic line-wise augmented document images and key information extraction ground truths. The collection of the original documents and the line-wise augmented documents therefore generate a large amount of training data.

The line-wise augmentation can be performed using multiple techniques. Some example techniques are shown as steps 506a, 506b, 506b, 506d, 506e. These steps may be performed alternately or in any combination/permutation on the one or more documents that are being line-wise augmented.

Figure 6A:
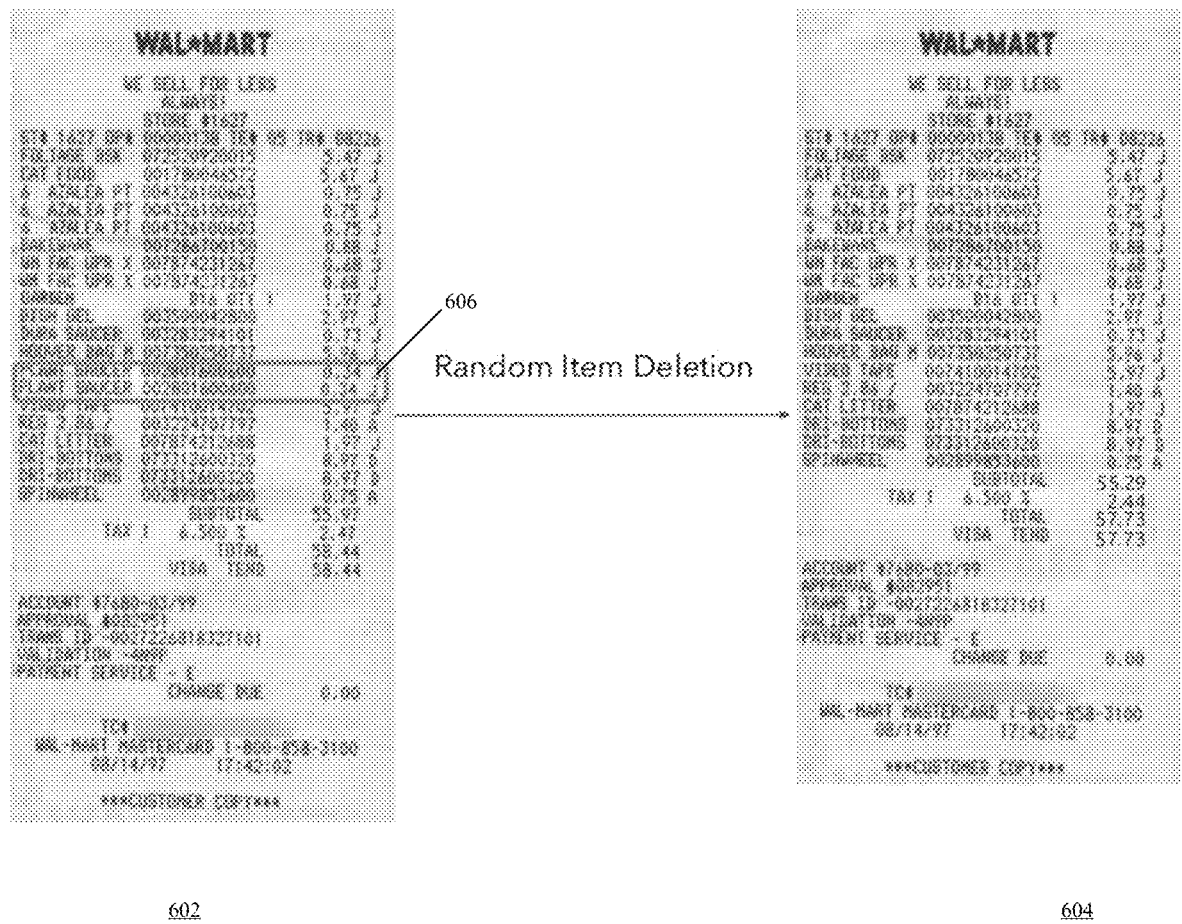
FIG. 6A shows an example of random line deletion, based on the principles disclosed herein.

At step 506a, line-wise augmentation is performed using random line deletion. FIG. 6A shows an example of random line deletion, based on the principles disclosed herein. Particularly, two line items 606 are deleted from the document 602 to generate another document 604. When the lines items 606 are deleted, the SUBTOTAL, TAX, and TOTAL fields are updated as well. As shown, for document 602, the subtotal is 55.97, the tax is 2.47, and the total is 58.44; with the deletion of line items 606 in document 604, the subtotal becomes 55.29, the tax becomes 2.44, and the total becomes 57.73. Here, document 602 is an original labeled document, document 604 is a synthetic labeled document; and both documents 602, 604 are used for training machine learning models.

Figure 6B:
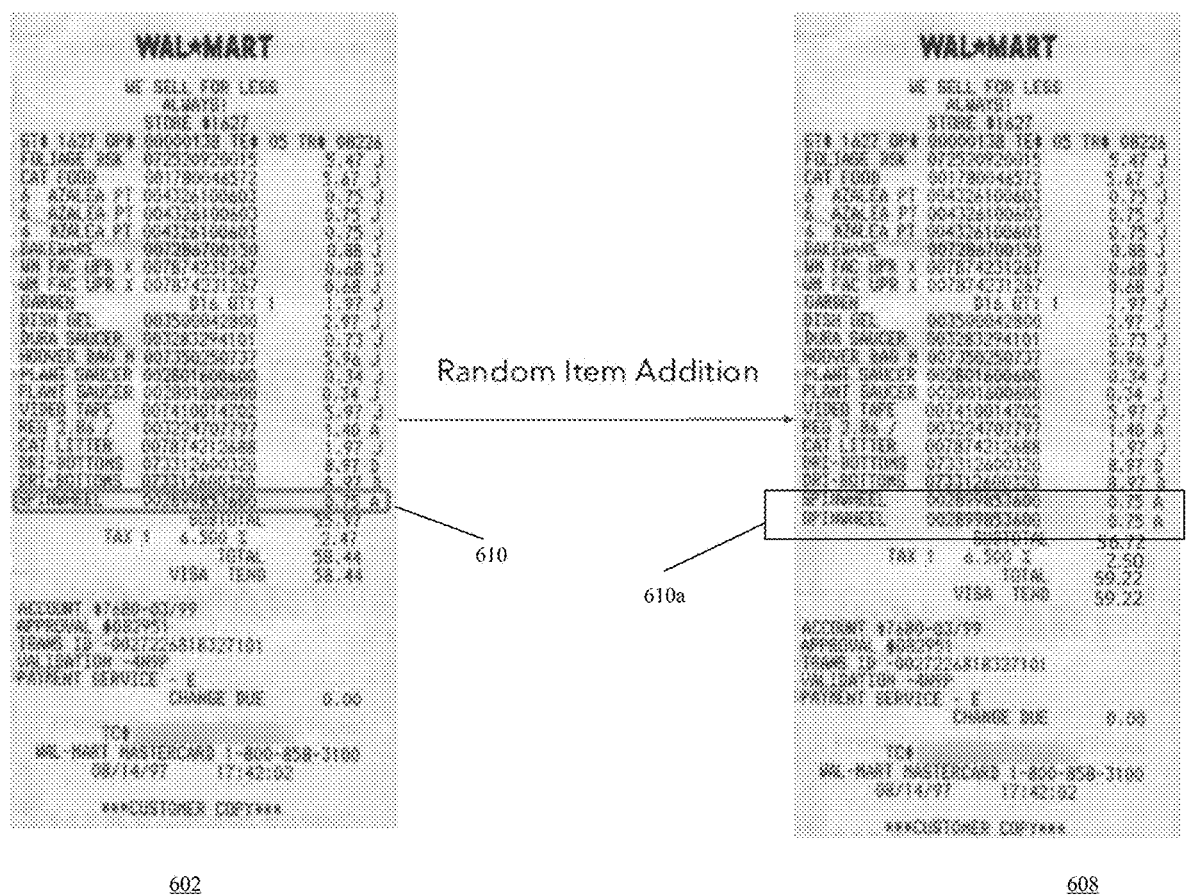
FIG. 6B shows an example of random line addition, based on the principles disclosed herein.

At step 506b, line-wise augmentation is performed using random line addition (the term "addition" should be understood to include the term "insertion"). FIG. 6B shows an example of random line addition/insertion, based on the principles disclosed herein. Particularly, a line item 610 is selected on document 602 and added to the original line items to generate document 608 that now includes two instances of line item 610. The two instances have been labeled as 610a in the document 608. The addition of the line item 610 (i.e., shown as 610a) also includes updates to the SUBTOTAL, TAX, and the TOTAL fields, and the corresponding updates of the line item ground truths. As shown, the document 608 has an updated subtotal of 56.72, an updated tax of 2.50, and an updated total of 59.22 compared to the fields of the document 602. Document 608 is another example of a synthetic labeled document for training machine learning models in accordance with the disclosed principles.

Figure 6C:
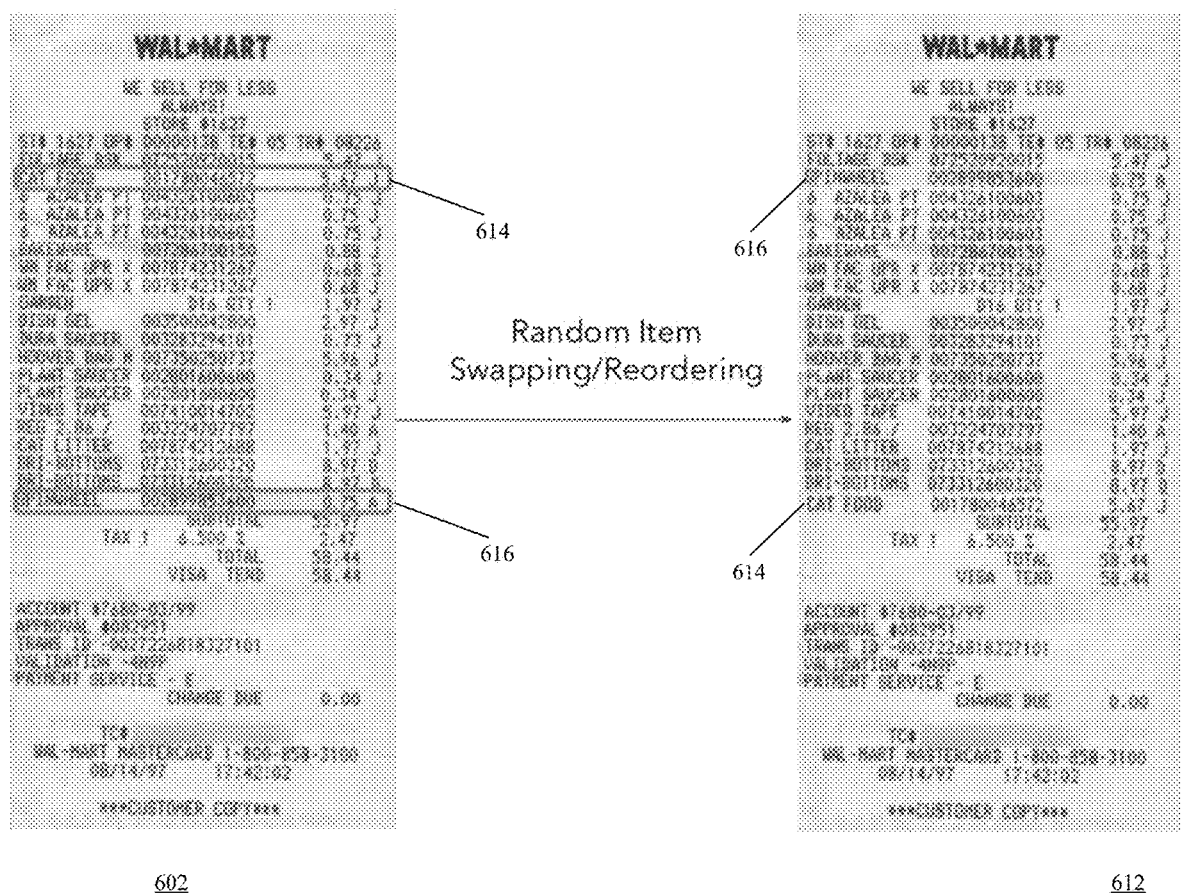
FIG. 6C shows an example of random line pair swapping, based on the principles disclosed herein.

At step 506c, line-wise augmentation is performed using random line pair swapping. FIG. 6C shows an example of random line pair swapping, based on the principles disclosed herein. Particularly, line items 614, 616 from document 602 are swapped to generate document 612. Because this swapping does not affect the SUBTOTAL, TAX, and TOTAL fields, these fields may not have to be updated for document 612. Document 612 is yet another example of a synthetic labeled document for training machine learning models in accordance with the disclosed principles.

At step 506d, line-wise augmentation is performed using cross document random line addition. Cross document random line addition is similar to the process shown in FIG. 6B, except for the line item additions are from different documents. For example, a line item from a first document is randomly selected and added to a second document to generate a synthetic labeled document.

At step 506e, line-wise augmentation is performed using cross document random line pair swapping. Cross document random line pair swapping is similar to the process shown in FIG. 6C, except for the line item swapping are from different documents. For example, a first line item from a first document and a second line item from the second document are added, respectively, to the second document and the first document to generate two synthetic labeled documents.

Therefore, using the steps 506a-506e, a number of target line items are randomly selected and one or more operations of deletion, addition (within a document and or across documents), and swapping (within document and or across documents) are performed. For each of these operations the SUBTOTAL, TAX, and TOTAL fields are updated accordingly to satisfy the arithmetic constraints. Because the original labeled document 602 contains the labels for these fields, the updates to these fields in the synthetic labeled documents can be inferred from the following arithmetic relations:

SUBTOTAL=TOTAL−TAX

TAX %=(TAX/TOTAL)*100%

Let the change in the line item amounts be D (positive for additions, negative for subtraction, and corresponding sign for cross-document random line pair swapping). Then, the updates are:

UPDATED SUBTOTAL=SUBTOTAL+$D$

UPDATED TAX=TAX %×UPDATED SUBTOTAL

UPDATED TOTAL=UPDATED SUBTOTAL+UPDATED TAX

At step 510, the line-wise augmented documents are used as synthetic training data to train machine learning models.

Using the embodiments herein, the synthetic training data can be customized based on the desired randomness with and or the desired number of line items of the line-wise augmented documents.

Figure 7:
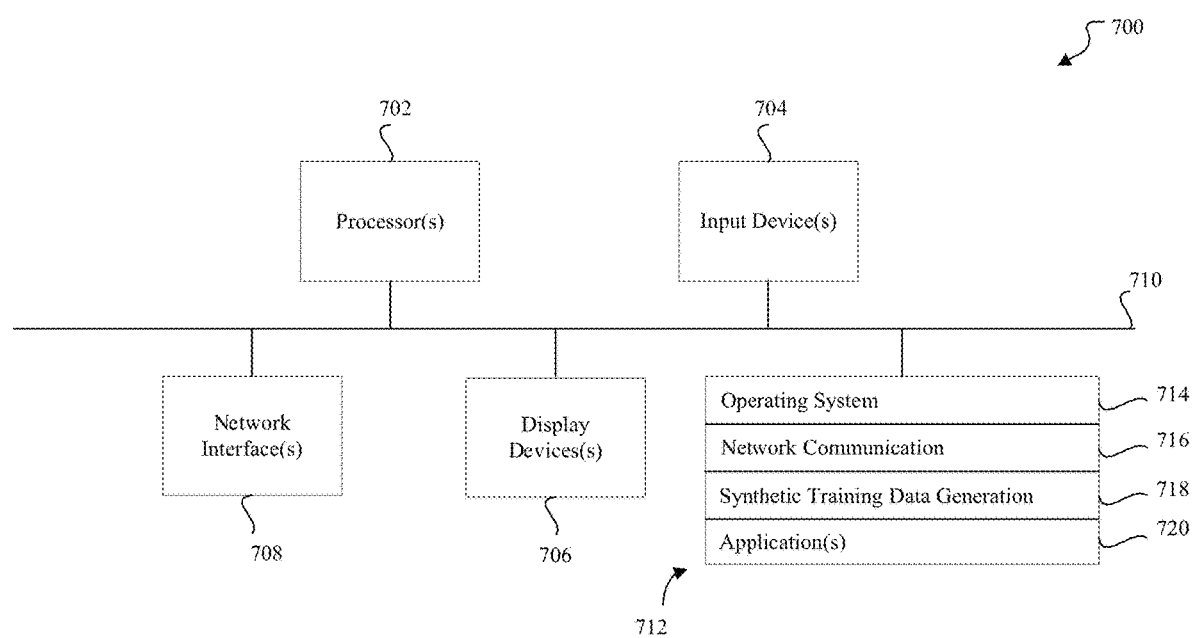
FIG. 7 shows a block diagram of an example computing device that implements various features and processes, based on the principles disclosed herein.

FIG. 7 shows a block diagram of an example computing device 700 that implements various features and processes, based on the principles disclosed herein. For example, computing device 700 may function as first server 120, second server 130, client 150*a*, client 150*b*, or a portion or combination thereof in some embodiments. Additionally, the computing device 700 partially or wholly forms the architecture 200. The computing device 700 also performs one or more steps of the methods 300 and 500. The computing device 700 is implemented on any electronic device that runs software applications derived from compiled instructions, including without limitation personal computers, servers, smart phones, media players, electronic tablets, game consoles, email devices, etc. In some implementations, the computing device 700 includes one or more processors 702, one or more input devices 704, one or more display devices 706, one or more network interfaces 708, and one or more computer-readable media 712. Each of these components is coupled by a bus 710.

Display device 706 includes any display technology, including but not limited to display devices using Liquid Crystal Display (LCD) or Light Emitting Diode (LED) technology. Processor(s) 702 uses any processor technology, including but not limited to graphics processors and multi-core processors. Input device 704 includes any known input device technology, including but not limited to a keyboard (including a virtual keyboard), mouse, track ball, and touch-sensitive pad or display. Bus 710 includes any internal or external bus technology, including but not limited to ISA, EISA, PCI, PCI Express, USB, Serial ATA or FireWire. Computer-readable medium 712 includes any non-transitory computer readable medium that provides instructions to processor(s) 702 for execution, including without limitation, non-volatile storage media (e.g., optical disks, magnetic disks, flash drives, etc.), or volatile media (e.g., SDRAM, ROM, etc.).

Computer-readable medium 712 includes various instructions 714 for implementing an operating system (e.g., Mac OS®, Windows®, Linux). The operating system may be multi-user, multiprocessing, multitasking, multithreading, real-time, and the like. The operating system performs basic tasks, including but not limited to: recognizing input from input device 704; sending output to display device 706; keeping track of files and directories on computer-readable medium 712; controlling peripheral devices (e.g., disk drives, printers, etc.) which can be controlled directly or through an I/O controller; and managing traffic on bus 710. Network communications instructions 716 establish and maintain network connections (e.g., software for implementing communication protocols, such as TCP/IP, HTTP, Ethernet, telephony, etc.).

Synthetic training data generation instructions 718 include instructions that implement the disclosed processes for generating synthetic training data for machine learning models, as described throughout this disclosure.

Application(s) 720 may comprise an application that uses or implements the processes described herein and/or other processes. The processes may also be implemented in the operating system.

The described features may be implemented in one or more computer programs that may be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment. In one embodiment, this may include Python. The computer programs therefore are polyglots.

Suitable processors for the execution of a program of instructions may include, by way of example, both general and special purpose microprocessors, and the sole processor or one of multiple processors or cores, of any kind of computer. Generally, a processor may receive instructions and data from a read-only memory or a random access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination thereof. The components of the system may be connected by any form or medium of digital data communication such as a communication network. Examples of communication networks include, e.g., a telephone network, a LAN, a WAN, and the computers and networks forming the Internet.

The computer system may include clients and servers. A client and server may generally be remote from each other and may typically interact through a network. The relationship of client and server may arise by virtue of computer programs running on the respective computers and having a client-server relationship to each other.

One or more features or steps of the disclosed embodiments may be implemented using an API. An API may define one or more parameters that are passed between a calling application and other software code (e.g., an operating system, library routine, function) that provides a service, that provides data, or that performs an operation or a computation. The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API. In some implementations, an API call may report to an application the capabilities of a device running the application, such as input capability, output capability, processing capability, power capability, communications capability, etc.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:

1. A method to generate training data for machine learning models, the method performed by a processor and comprising:
   detecting a line items block in a source document;
   labeling individual line items in the line items block to generate a labeled document from the source document; and
   performing a line-wise augmentation of the individual line items by an adding operation to generate a labeled synthetic document comprising an augmented line items block from the line items block of the labeled document, wherein both the labeled document and the labeled synthetic document are configured to be used as the training data, the adding operation comprising:
   randomly selecting a line item in the line items block of the labeled document; and
   adding the randomly selected line item to the line items block to generate the labeled synthetic document with the augmented line items block.

2. The method of claim 1, wherein the adding operation further comprises:
   randomly selecting a second line item in a second line items block of a second labeled document different from the labeled document; and
   adding the randomly selected second line item to the line items block to generate the labeled synthetic document with the augmented line items block.

3. The method of claim 1, the line-wise augmentation of the individual line items being further performed by a deleting operation comprising:
   randomly selecting a second line item in the line items block of the labeled document; and
   deleting the randomly selected second line item from the line items block to generate the labeled synthetic document with the augmented line items block.

4. The method of claim 1, the line-wise augmentation of the individual line items being further performed by a swapping operation comprising:
   randomly selecting a second line item in the line items block of the labeled document;
   randomly selecting a third line item in the line items block of the labeled document; and
   swapping positions of the third line item and the second line item in the line items block to generate the labeled synthetic document with the augmented line items block.

5. The method of claim 1, the line-wise augmentation of the individual line items being further performed by a swapping operation comprising:
   randomly selecting a second line item in the line items block of the labeled document;
   randomly selecting a third line item in a second line items block of a second document; and
   swapping positions of the second line item and the third line item in the line items block and the second line items block to generate the labeled synthetic document with the augmented line items block and to generate a second synthetic labeled document from the second document.

6. The method of claim 1, further comprising:
   recalculating a field value outside of the items block in response to performing the adding operation.

7. The method of claim 6, wherein the labeled document comprises at least one of a bill, invoice, or receipt, and wherein recalculating the field value comprises:
   recalculating at least one of a subtotal field, a tax field, or a total field.

8. The method of claim 1, wherein detecting the line items block comprises:
   heuristically determining geometric bounds of the line items block based on other labeled information blocks; or
   using a pre-trained table detection machine learning model.

9. The method of claim 1, wherein labeling the individual line items comprises:
   extracting text in the line items block using optical character recognition;
   identifying numeric strings from the extracted text;
   determining that the identified numeric strings satisfy arithmetic constraints;
   using vertical positions of the numeric strings to define the individual line items; and
   labeling the numeric strings as line item amounts and corresponding text as line item description.

10. A system comprising:
    a non-transitory storage medium storing computer program instructions; and
    one or more processors configured to execute the computer program instructions to cause operations comprising:
    detecting line items block in a source document;

labeling individual line items in the line items block to generate a labeled document from the source document; and performing a line-wise augmentation of the individual line items by an adding operation to generate a labeled synthetic document comprising an augmented line items block from the line items block of the labeled document, wherein both the labeled document and the labeled synthetic document are configured to be used as training data, the adding operation comprising:

randomly selecting a line item in the line items block of the labeled document; and adding the randomly selected line item to the line items block to generate the labeled synthetic document with the augmented line items block.

11. The system of claim 10, wherein the adding operation further comprises:

randomly selecting a second line item in a second line items block of a second labeled document different from the labeled document; and adding the randomly selected second line item to the line items block to generate the labeled synthetic document with the augmented line items block.

12. The system of claim 10, the line-wise augmentation of the individual line items being further performed by a deleting operation comprising:

randomly selecting a second line item in the line items block of the labeled document; and deleting the randomly selected second line item from the line items block to generate the labeled synthetic document with the augmented line items block.

13. The system of claim 10, the line-wise augmentation of the individual line items being further performed by a swapping operation comprising:

randomly selecting a second line item in the line items block of the labeled document;

randomly selecting a third line item in the line items block of the labeled document; and swapping positions of the third line item and the second line item in the line items block to generate the labeled synthetic document with the augmented line items block.

14. The system of claim 10, the line-wise augmentation of the individual line items being further performed by a swapping operation comprising:

randomly selecting a second line item in the line items block of the labeled document;

randomly selecting a third line item in second line items block of a second document; and swapping positions of the second line item and the third line item in the line items block and the second line items block to generate the labeled synthetic document with the augmented line items block and to generate a second synthetic labeled document from the second document.

15. The system of claim 10, further comprising:

recalculating a field value outside of the items block in response to performing the adding operation.

16. The system of claim 15, wherein the labeled document comprises at least one of a bill, invoice, or receipt, and wherein recalculating the field value comprises:

recalculating at least one of a subtotal field, a tax field, or a total field.

17. The system of claim 10, wherein detecting the line items block comprises:

heuristically determining geometric bounds of the line items block based on other labeled information blocks; or using a pre-trained table detection machine learning model.

18. The system of claim 10, wherein labeling the individual line items comprises:

extracting text in the line items block using optical character recognition;

identifying numeric strings from the extracted text;

determining that the identified numeric strings satisfy arithmetic constraints;

using vertical positions of the numeric strings to define the individual line items; and labeling the numeric strings as line item amounts and corresponding text as line item description.

* * * * *